US012768104B2

(12) United States Patent
Tuovinen

(10) Patent No.: US 12,768,104 B2
(45) Date of Patent: Oct. 20, 2026

(54) METHOD FOR MANUFACTURING REFINING SEGMENT AND REFINING SEGMENT

(71) Applicant: Valmet Technologies, Inc., Espoo (FI)

(72) Inventor: Olli Tuovinen, Tampere (FI)

(73) Assignee: Valmet Technologies, Inc., Espoo (FI)

( * ) Notice: Subject to any disclaimer, the term of this patent is extended or adjusted under 35 U.S.C. 154(b) by 398 days.

(21) Appl. No.: 18/494,956

(22) Filed: Oct. 26, 2023

(65) Prior Publication Data

US 2024/0150962 A1 May 9, 2024

(30) Foreign Application Priority Data

Nov. 8, 2022 (FI) ...................................... 20226007

(51) Int. Cl.
*D21D 1/30* (2006.01)
*B02C 7/12* (2006.01)

(52) U.S. Cl.
CPC ............... *D21D 1/306* (2013.01); *B02C 7/12* (2013.01)

(58) Field of Classification Search
CPC .... B02C 7/02; B02C 7/04; B02C 7/06; B02C 7/0812; D21D 1/306
See application file for complete search history.

(56) References Cited

U.S. PATENT DOCUMENTS

| | | | | |
|---|---|---|---|---|
| 4,157,669 A * | 6/1979 | Pilao | D21D 1/306 76/115 |
| 5,740,972 A * | 4/1998 | Matthew | B02C 7/12 241/261.3 |
| 9,976,253 B2 * | 5/2018 | Tichy | D21D 1/30 |
| 2004/0128817 A1 * | 7/2004 | Lange | D21D 1/008 29/423 |
| 2009/0045278 A1 * | 2/2009 | Bech | D21D 1/306 241/297 |
| 2019/0330798 A1 * | 10/2019 | Min | B22C 9/22 |

* cited by examiner

*Primary Examiner* — Matthew Katcoff
(74) *Attorney, Agent, or Firm* — Stiennon & Stiennon

(57) ABSTRACT

A refining segment (4, 8) for refining fibrous material, and a refining segment (4, 8) for a refiner (1) for refining fibrous material is formed by arranging at least one set of profiled wires (22) next to each other and substantially immovable with respect to each other, wherein a width (Wa) of a bottom (22*a*) of the profiled wire (22) is different from a width (Wb) of a top (22*b*) of the profiled wire (22), to form at least one refining bar element (24), and fastening the at least one refining bar element (24) onto a back plate (19), wherein said back plate forms a body of the refining segment (4, 8), by applying at least one solidifying substance (25) between the at least one refining bar element (24) and the back plate (19).

21 Claims, 4 Drawing Sheets

METHOD FOR MANUFACTURING REFINING SEGMENT AND REFINING SEGMENT

CROSS REFERENCES TO RELATED APPLICATIONS

This application claims priority on FI 20226007, filed Nov. 8, 2022, the disclosure of which is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The invention relates to the refining of fibrous material and especially to a method for manufacturing a refining segment, and a refining segment for refining fibrous material.

Refiners used for refining fibrous material, such as a wood material containing lignocellulose or another fiber material suitable to be used for manufacturing pulp, paper, or paperboard, for example, comprise typically a stator and a rotor opposite to each other, the rotor rotating about its central axis, thereby turning relative to the stator. The stator and the rotor comprise refining surfaces provided with refining bars and refining grooves therebetween, the refining bars being intended to defiber and refine the material to be refined and the refining grooves being intended to convey the material to be refined forward along the refining surfaces. The refining surface of the stator and the rotor may be formed of several refining segments fastened to a body of the respective stator/rotor. In that case the complete refining surface of the respective stator/rotor is thus formed of the refining surfaces of several refining segments fastened next to each other in the respective stator/rotor.

A typical method for manufacturing the refining segment is casting, wherein melt metal, such as iron or steel, is poured into a mould shaped to provide a design for the refining surface on top of a body of the refining segment, the body of the refining segment and the refining surface on top of it forming a uniform combined cast segment. After the metal has hardened, the cast refining segment is removed from the mould, and the refining segment is ready for use, or the refining bars and the refining grooves may additionally be machined to provide the finished intended design of the refining surface.

A problem relating to the manufacturing of the refining segments by casting is that due to a limited mould construction accuracy in casting, it is in practice impossible to provide very dense refining surface configurations, i.e., refining surface configurations wherein the width of the refining bars and refining grooves are in a range of only one or a few millimetres. Other problems in this kind of casted refining segments are incomplete filling of the refining bars and high surface roughness of the refining bars, which are not possible to complete or make smoother after casting.

According to a prior art method for manufacturing a refining segment, bars made of metal strips and providing the refining bars of the refining segment are set on top of a back plate at a distance from each other and the refining bars are welded to the back plate. With this method the machining of the refining bars and the refining grooves after casting may be avoided and a very dense refining surface configuration is also possible. However, a problem relating to the manufacturing of the very dense refining surface configurations by this way is for example an amount of the welding work which can reach up to tens of kilometres to provide a complete refining surface of an entire refining element.

Therefore, there is a need to provide an alternative solution for manufacturing refining segments, especially for manufacturing refining segments with very dense refining surface configurations.

SUMMARY OF THE INVENTION

An object of the present invention is to provide a novel method for manufacturing a refining segment and a novel refining segment for refining fibrous material.

The invention is based on implementing refining bars in a refining segment of a profiled wire having a width of a bottom of the profiled wire different from a width of a top of the profiled wire and on arranging at least one set of the profiled wires next to each other and substantially immovable with respect to each other to form at least one refining bar element. The at least one refining bar element is fastened onto a back plate, wherein said back plate forms a body of the refining segment, by applying at least one solidifying substance between the at least one refining bar element and the back plate.

The method disclosed provides an efficient way, especially in view of manufacturing costs and time, to manufacture refining segments especially with very dense refining surface configurations.

BRIEF DESCRIPTION OF THE DRAWINGS

In the following the invention will be described in greater detail by means of preferred embodiments with reference to the accompanying drawings.

For the sake of clarity, the figures show some embodiments of the invention in a simplified manner. Like reference numerals identify like elements in the figures.

DESCRIPTION OF THE PREFERRED EMBODIMENTS

Figure 1:
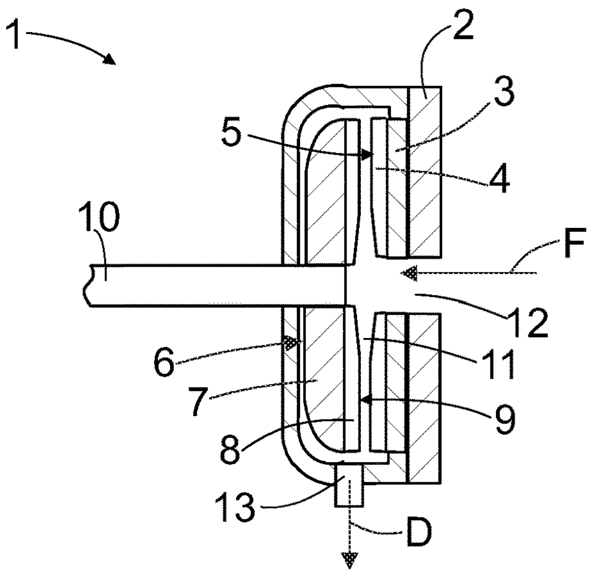
FIG. 1 shows schematically a partly cross-sectional side view of a disc refiner comprising disclike refining elements.

FIG. 1 is a schematic side view of a refiner 1 in cross-section. The refiner 1 may for example be used for refining lignocellulose-containing wood-based fibrous material, or plant-based fibrous material, or a recycled fibrous material. The fibrous material to be refined in the refiner 1 has a form of pulp suspension, i.e., a mixture of water and fibrous material and possibly some additives. The fiber consistency of the fibrous material to be refined may vary depending on the production requirements. The refiner 1 shown in FIG. 1 is a disc refiner but conical refiners, conical-disc-refiners and cylindrical refiners could be used as well as an example here.

The refiner 1 of FIG. 1 comprises a frame 2 and a stationary stator 3 supported on the frame 2. The stator 3 comprises two or more stator refining segments 4, each of them comprising refining bars and refining grooves therebetween. The refining bars and the refining grooves in each stator refining segment 4 form a refining surface 5 of the respective refining segment 4, the refining surface 5 of each stator refining segment 4 thereby providing a part of a refining surface of the stator 3. A complete refining surface of the stator 3 is formed of the refining surfaces 5 of a necessary number of the stator refining segments 4 fastened next to each other in the stator 3 so that the complete refining surface 5 extending over the whole circumference of the stator 3 is provided. For the sake of clarity, both the refining surface of each single stator refining segment 4 as well as the complete refining surface of the stator 3 are herein denoted with the same reference sign 5.

The refiner 1 further comprises a rotor 6 of the refiner 1. The rotor 6 comprises a rotor frame 7. The rotor frame 7 is connected to a rotatable shaft 10 used to rotate the rotor 6 about its central axis. The rotor 6 further comprises two or more rotor refining segments 8 supported to the rotor frame 7, each rotor refining segment 8 comprising refining bars and refining grooves therebetween. The refining bars and the refining grooves in each rotor refining segment 8 form a refining surface 9 of the respective refining segment 8, the refining surface 9 of each rotor refining segment 8 thereby providing a part of a refining surface of the rotor 6. A complete refining surface of the rotor 6 is formed of the refining surfaces 9 of a necessary number of the rotor refining segments 8 fastened next to each other in the rotor 6 so that the complete refining surface 9 extending over the whole circumference of the rotor 6 is provided. For the sake of clarity, both the refining surface of each single rotor refining segment 8 as well as the complete refining surface of the rotor 6 are herein denoted with the same reference sign 9.

The fibrous material to be refined is fed into the refiner 1, into a refining gap 11 remaining between the stator 2 and the rotor 6 opposite to each other via a feed channel 12 in a manner shown by arrow F. The refined material is removed via a discharge channel 13 from the refiner 1, as schematically shown by arrow D. The fibrous material to be refined is fed into the refiner 1 in a form of pulp suspension being a mixture comprising at least water and virgin fibrous material and/or recycled fibrous material.

Figure 2:
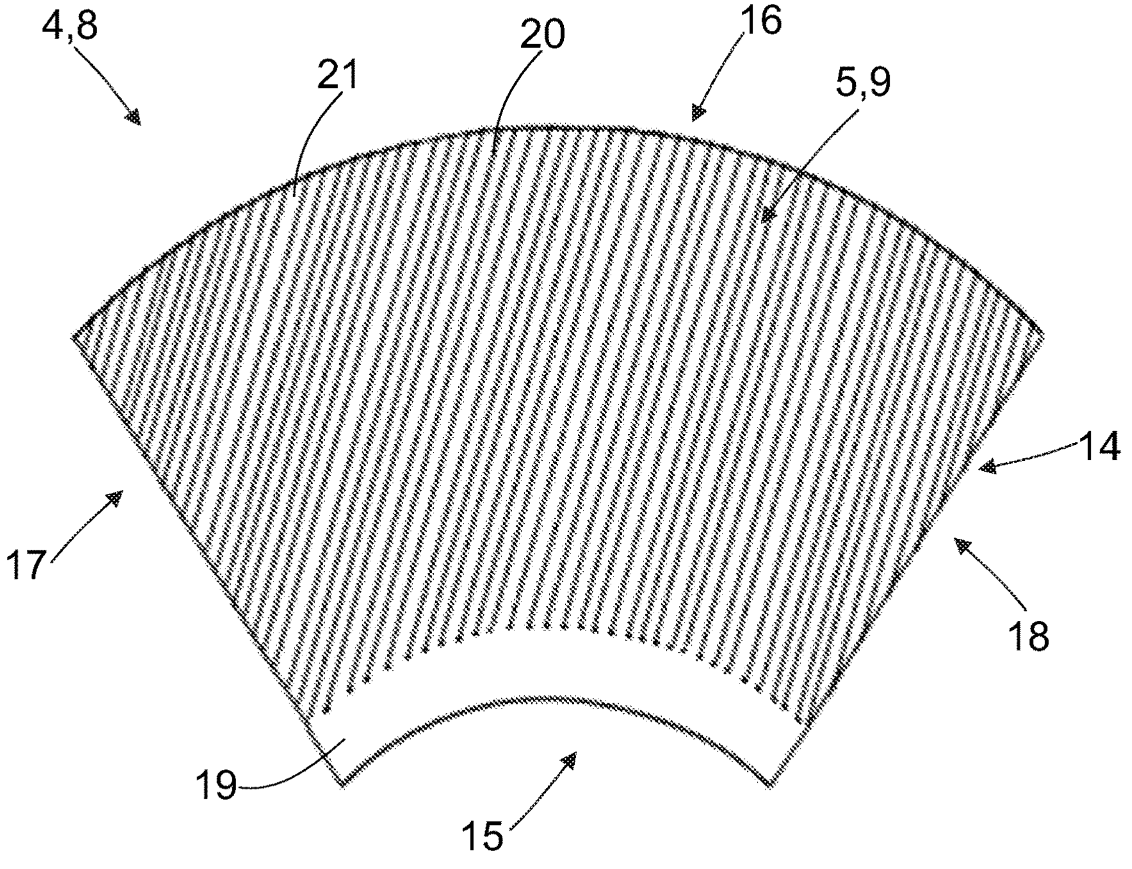
FIG. 2 shows schematically a front view of a refining segment for a disc refiner.

FIG. 2 is a schematic front view of a refining segment 4, 8 applicable to be used for forming a part of the refining surface 5, 9 of the stator 3 or the rotor 6 of a disc refiner 1, whereby the complete refining surfaces 5, 9 in the stator 3 and the rotor 6 are provided by arranging the necessary number of the refining segments 4, 8 of FIG. 2 next to each other around a circumference of the stator 3 or the rotor 6. The solution described in this description below is exemplified especially for the disc-like refining segments 4, 8 applicable to be used in the disc refiner 1 and a conical-disc-refiner but the solution may respectively be applied for conical and cylindrical refining segments to be used in conical refiners, conical-disc-refiners and cylindrical refiners.

The refining segment 4, 8 comprises an inner end edge 15 or a first end edge 15 being intended to be directed towards an inner periphery of the stator 3 or the rotor 6. The refining segment 4, 8 further comprises an outer end edge 16 or a second end edge 16 opposite to the inner end edge 15 in a longitudinal direction of the refining segment 4, 8, the outer end edge 16 being intended to be directed towards an outer periphery of the stator 3 or the rotor 6. The refining segment 4, 8 further comprises a first side edge 17 extending from the inner end edge 15 of the refining segment 4, 8 up to the outer end edge 16 of the refining segment 4, 8. The refining segment 4, 8 further comprises a second side edge 18 opposite to the first side edge 17 in a circumferential direction of the refining segment 4, 8. The second side edge 18 extends from the inner end edge 15 of the refining segment 4, 8 up to the outer end edge 18 of the refining segment 4, 8. The inner 15 and the outer 16 end edges together with the first 17 and second 18 side edges contribute to define a periphery 14 of the refining segment 4, 8. In conical refiners, typically, the radially smaller end of the stator/rotor is considered to refer to the inner periphery of the stator/rotor and the radially larger end of the stator/rotor is considered to refer to the outer periphery of the stator/rotor.

The refining segment 4, 8 of FIG. 2 comprises a refining segment back plate 19, i.e., a body 19 of the refining segment 4, 8 that is typically made of metal, such as iron or steel. A front surface of the refining segment 4, 8, i.e., the side of the refining segment 4, 8 to be directed towards the refining gap 11 of the refiner 1, is provided with refining bars 20 and refining grooves 21 between the refining bars 20, the refining bars 20 and the refining grooves 21 together providing the refining surface 5, 9 of the refining segment 4, 8. In FIG. 2 the refining bars 20 are shown schematically with black lines and the refining grooves 21 are shown with white lines between the black lines. The refining bars 20 are intended to defiber and refine the material to be refined and the refining grooves 21 are intended to convey the material to be refined between the refining bars 20 forward along the refining surface 5, 9. Generally, a refining segment may have different patterns consisting of variable refining bars and refining grooves in order to provide certain performance according to the actual production needs, and the refining surface 5, 9 of the refining segment 4, 8 is shown in FIG. 2 for a purpose of exemplary illustration only. The actual implementation of the refining surfaces 5, 9 may thus vary in many ways.

The refining segment 4, 8 may further comprise one or more nondisclosed fastening holes extending through the back plate 19 and intended to receive proper fastening members, such as bolts, for fastening the respective refining segment 4, 8 to the frame 2 of the refiner 1 or to the frame 7 of the rotor 6.

Figure 3A:
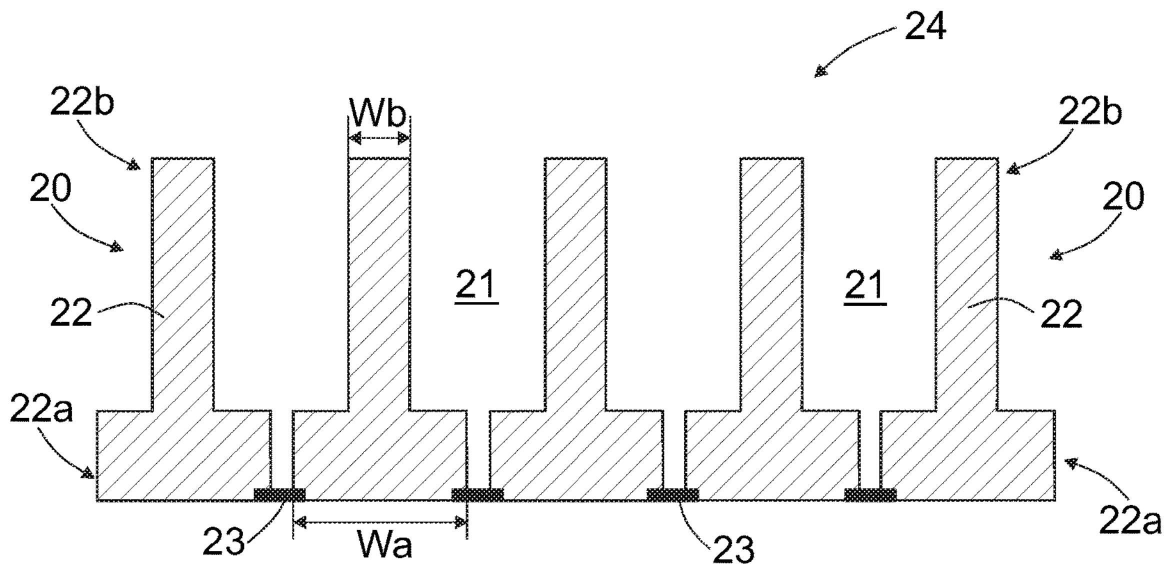
FIGS. 3A, 3B, 3C and 3D show schematically a method for manufacturing a refining segment and a finished refining segment.
Figure 3B:
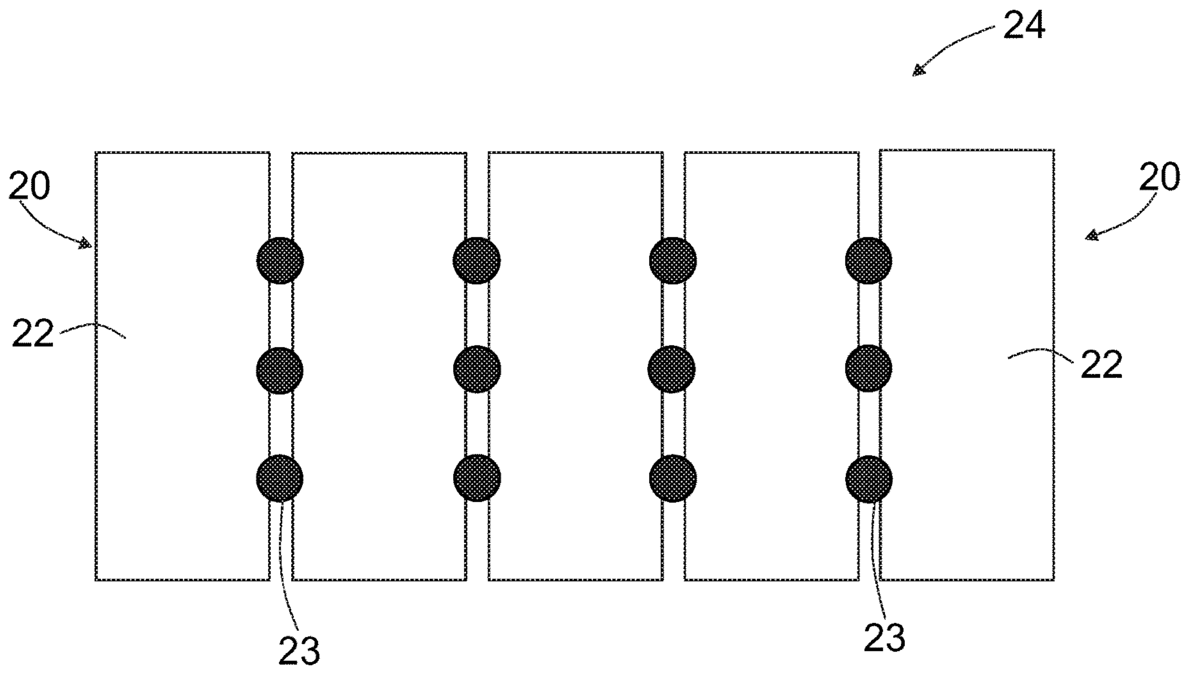
Figure 3C:
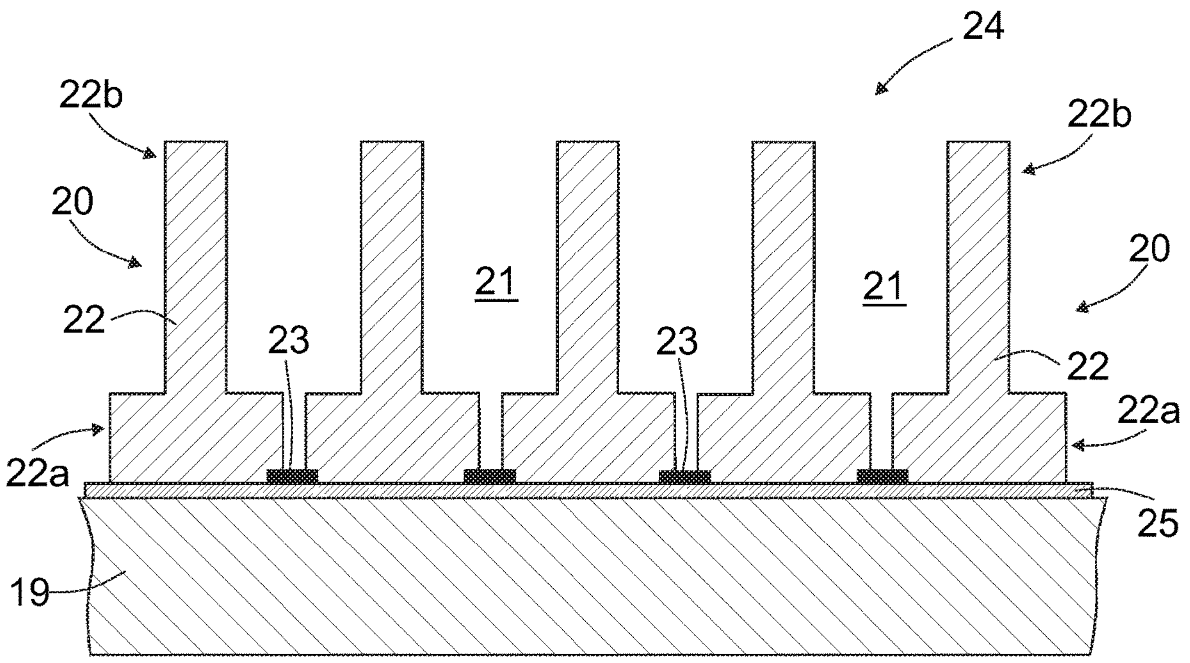
Figure 3D:
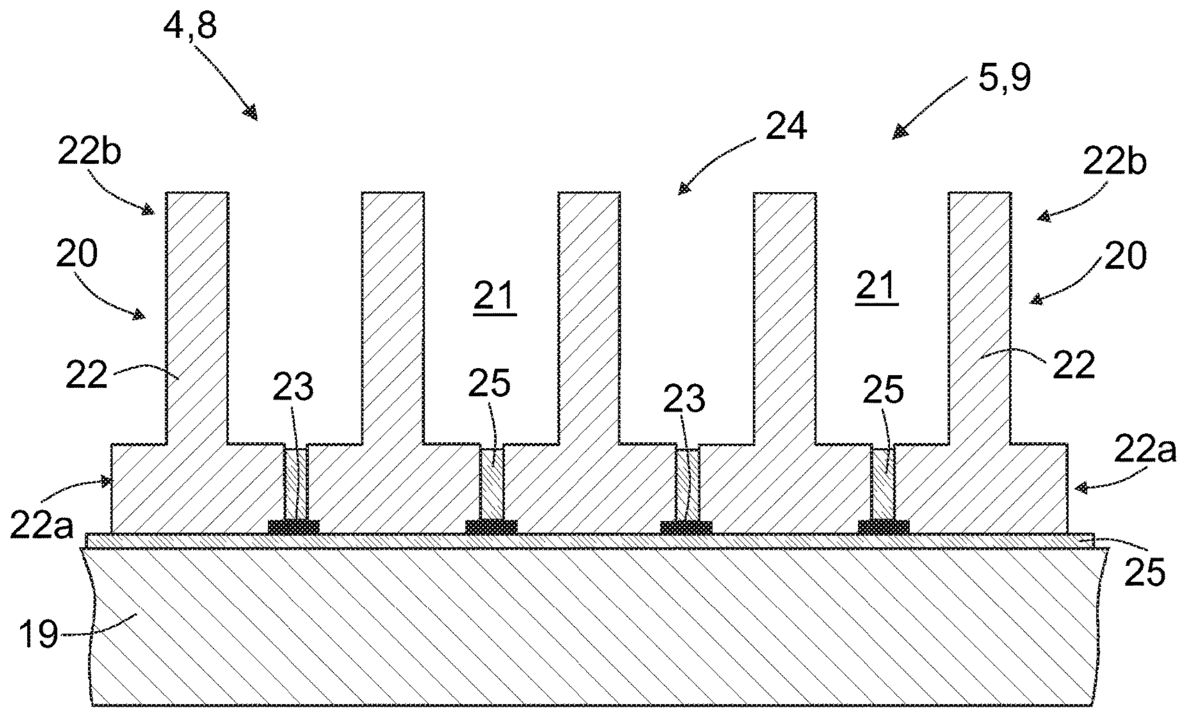

FIGS. 3A, 3B, 3C and 3D show schematically a method for manufacturing a refining segment 4, 8 applicable to be used either in a stator 3 or a rotor 6 of a refiner 1. FIG. 3A shows schematically a cross-sectional end view of a set of profiled wires 22 that are intended to form the refining bars 20 of the refining segment 4, 8, FIG. 3B shows schematically a bottom view of the set of the profiled wires 22 of FIG. 3A, FIG. 3C shows schematically an intermediate stage of manufacturing of the refining segment 4,8 wherein the set of the profiled wires 22 of FIG. 3A are laid onto a back plate 19 that forms the body of the refining segment 4, 8, and FIG. 3D shows schematically the finished refining segment 4,8.

Referring to FIGS. 3A and 3B, FIGS. 3A and 3B show schematically profiled wires 22 arranged next to each other at a distance from each other such that there is a substantially free gap or space between adjacent profiled wires 22. The profiled wires 22 are intended to form the refining bars 20 in a finished refining segment 4, 8, i.e., the refining bars 20 of the refining segment 4, 8 are implemented of a profiled wire 22. The profiled wires 22 are made of metal, such as steel.

In the embodiment of FIGS. 3A to 3D a width Wa of a bottom 22*a* of the profiled wire 22 is greater than a width Wb of a top 22*b* of the profiled wire 22 such that a refining groove 21 completely open upwards is formed between adjacent profiled wires 22. Generally, profiled wires having the width Wa of the bottom of the profiled wire 22 different from the width Wb of the top of the profiled wire 22 may be applied for implementing the refining bars 20 so as to form refining grooves 21 with different cross-sectional configurations depending for example on intended flow behavior of the fibrous material on the refining surface 5, 9 of the refining segment 4, 8. The bottom 22*a* of the profiled wire 22 provides a base section of the refining bar 20, and the top 22*b* of the profiled wire 22 provides a refining section of the refining bar 20.

The profiled wires 22 in FIGS. 3A and 3B are furthermore arranged substantially immovable with respect to each other. This may be implemented for example by pre-fastening the adjacent profiled wires 22 to each other. In the embodiment of FIGS. 3A to 3D the profiled wires 22 are pre-fastened to each other by spot welds 23 between the bottoms 22*a* of the adjacent profiled wires 22 but other mechanical or chemical applications, for instance, for pre-fastening the adjacent profiled wires 22 to each other could be applied as well.

The set of the profiled wires 22 arranged next to each other such that they are arranged at the distance from each other and substantially immovable with respect to each other form a refining bar element 24 that is intended to form at least a part of a refining surface 5, 9 of a refining segment 4, 8. In the embodiment of FIGS. 3A to 3D the refining bar element 24 comprises profiled wires 22 arranged in substantially parallel straight configuration but generally the profiled wires 22 in the refining bar element 24 may be arranged in substantially parallel straight or curved configuration, depending on an intended configuration of the refining surface 5,9 of the refining segment 4, 8.

Referring to FIG. 3C, the refining bar element 24 disclosed in FIGS. 3A and 3B is fastened onto the back plate 19 of the refining segment 4, 8 by applying, between the refining bar element 24 and the back plate 19, at least one solidifying substance 25 intended to fasten the refining bar element 24 onto the back plate 19. At least one layer of the at least one solidifying substance 25 intended to fasten the refining bar element 24 onto the back plate 19 is applied on top of the back plate 19 and thereafter the refining bar element 24 is laid onto the at least one layer of the substance 25 applied on top of the back plate 19. When the at least one substance 25 solidifies or hardens, the at least one substance 25 fastens the refining bar element 24, i.e., the profiled wires 22 forming the re-fining bars 20 in the refining bar element 24, to the back plate 19 for forming a semi-finished refining segment 4, 8. For the sake of clarity, the size of the profiled wires 22 relative to the size of the back plate 19 of the refining segment 4, 8 is exaggerated in FIGS. 3A to 3D, as well as in FIG. 4 later.

According to an embodiment, at least one layer of the solidifying substance 25 is applied on top of the back plate 19 in a solid form. Thereafter heat is applied to the at least one layer of the solidifying substance 25 to transform the at least one layer of the solidifying substance 25 having originally been in a solid form into a molten form, whereafter the refining bar element 24 is set on top of the solidifying substance 25 being in the molten form, whereby the solidifying substance 25 remains between the back plate 19 and the bottoms 22*a* of the profiled wires 22 and also infiltrates between the bottoms 22*a* of the adjacent profiled wires 22 in the refining bar element 24.

According to an embodiment, at least one layer of the solidifying substance 25 is applied on top of the back plate 19 in a solid form and the refining bar element 24 is set on top of the solidifying substance 25 still being in the solid form. Thereafter heat is applied to the at least one layer of the solidifying substance 25 to transform the at least one layer of the solidifying substance 25 into the molten form, whereby the solidifying substance 25 remains between the back plate 19 and the bottoms 22*a* of the profiled wires 22 and also infiltrates between the bottoms 22*a* of the adjacent profiled wires 20 in the refining bar element 24.

According to an embodiment, at least one layer of the solidifying substance 25 is applied on top of the back plate 19 in a molten form. Thereafter the refining bar element 24 is set on top of the solidifying substance 25 being in the molten form, whereby the solidifying substance 25 remains between the back plate 19 and the bottoms 22*a* of the profiled wires 22 and also infiltrates between the bottoms 22*a* of the adjacent profiled wires 22 in the refining bar element 24.

In any of the three embodiments disclosed above for fastening the refining bar element 24 on top of the back plate 19, additional solidifying substance 24 may be applied in a molten form may be applied between the bottoms 22*a* of the profiled wires 22 if necessary.

The at least one substance 25 is thus brought, in some of its use situation, to a molten form, i.e., to a form of liquid suspension, but over time it becomes solidified or hardened. The solidification or hardening of the at least one substance 25 may be intensified, depending on the composition of the at least one substance 25, by cooling or heating it. The at least one substance 25 may be used to create totally complete joints between the profiled wires 22 and the refining segment back plate 25, as well as between the adjacent profiled wires 22, because in the molten form the at least one substance 25 can also find its way up to all voids between the profiled wires 22 and the refining segment back plate 25, as well as between the adjacent profiled wires 22. This means that the bonding of the refining bars to the back plate is complete, i.e., there are 100% complete joints between the refining bars and the back plate, which provides expected refining effects with sufficient evenness and strength. The disclosed solution thus allows to avoid a problem of incomplete fastening of the refining bars to the back plate of the refining segment possibly appearing in prior art solutions involving for example welding of the refining bars to the back plate, which incomplete fastening may result in uneven refining effects or wearing of the refining bars.

FIG. 3D shows schematically the finished refining segment 4, 8 wherein there are at least one solidifying substance 25 having been applied between the refining segment back plate 19 and the profiled wires 22 forming the refining bar element 24 as well as at least one solidifying substance 25 having been applied also between the bottoms 22*a* of the profiled wires 22 for fastening the adjacent profiled wires 22 in the refining bar element 24 to each other. The at least one substance 25 infiltrated between the adjacent profiled wires 22, after becoming solidified or hardened, also forms together with the bottoms 22*a* of the adjacent profiled wires 22 bottoms of the refining grooves 21. The at least one substance 25 is preferably infiltrated between the bottoms 22*a* of the adjacent profiled wires 22 to that extent that the at least one substance 25 substantially remains between the bottoms 22*a* of the adjacent profiled wires 22 and does not extend at least to a greater extent up to the area remaining between the tops of the adjacent profiled wires 22 which tops of the profiled wires form the refining sections of the refining bars 20. The method shown in FIGS. 3A to 3D may thus be used to manufacture the refining segment 4, 8 like that shown generally for example in FIG. 2. According to an embodiment, the profiled wires 22 intended to provide the refining bars 20 can be cut to have specific lengths, based on the intended finished refining surface configuration, before forming the refining bar element 24 as shown in FIGS. 3A and 3B. By this way a loss of the profiled wire may be minimized. Alternatively, the blade bar element 24 may be formed of profiled wires 22 having initially a substantially same length, as shown schematically in FIG. 3B, whereafter the blade bar element 24 is cut to a predetermined shape, according to the shape of the back plate 19 and the intended configuration of the finished refining surface 5, 9 therein, before fastening the blade bar element 24 to the back plate 19 of the refining segment 4, 8.

According to an embodiment, the at least one solidifying substance 25 comprises metal, whereby the profiled wires 22 become metallurgically bonded to each other and to the back plate 19. After the at least one substance 25 has solidified or hardened, the profiled wires 22 and the back plate 19 form a substantially uniform structure, although some kind of border line between the solidified substance 24 and the material of the profiled wire 22 and/or the back plate 19 may be visible in the cross section of the refining segment 4, 8. After the at least one substance 25 has solidified or hardened, the at least one substance 25 constitutes for its part also abrasion resistant surfaces in the refining segment 4, 8.

According to an embodiment, the at least one solidifying substance 25 is braze, i.e., a metal alloy comprising for example iron, copper, nickel and/or silver. The composition of the braze is thus different from the composition of metal material of the profiled wires 22 or of the back plate 19. A melting temperature of typical braze material is about 450° C., whereby the melting temperature of the braze material is substantially low when considering the melting of the braze material, and thereby it does not have effect on the properties of the profiled wires 22 or the back plate 19 of the refining segment 4, 8 that are manufactured from a material with a higher melting temperature. The melting temperature of the braze material is still high enough so that the fastening of the profiled wires 22 to the finished refining segment 4, 8 will not become weakened by temperatures appearing in the refiner during refining. The braze thus forms one kind of solidifying or hardening metallic substance that can be used as a filler metal for joining the profiled wires 22 to the back plate 19.

According to an embodiment, the at least one solidifying substance 25 comprises glue. The glue may for example be plastic based or resin-based glue.

Figure 4:
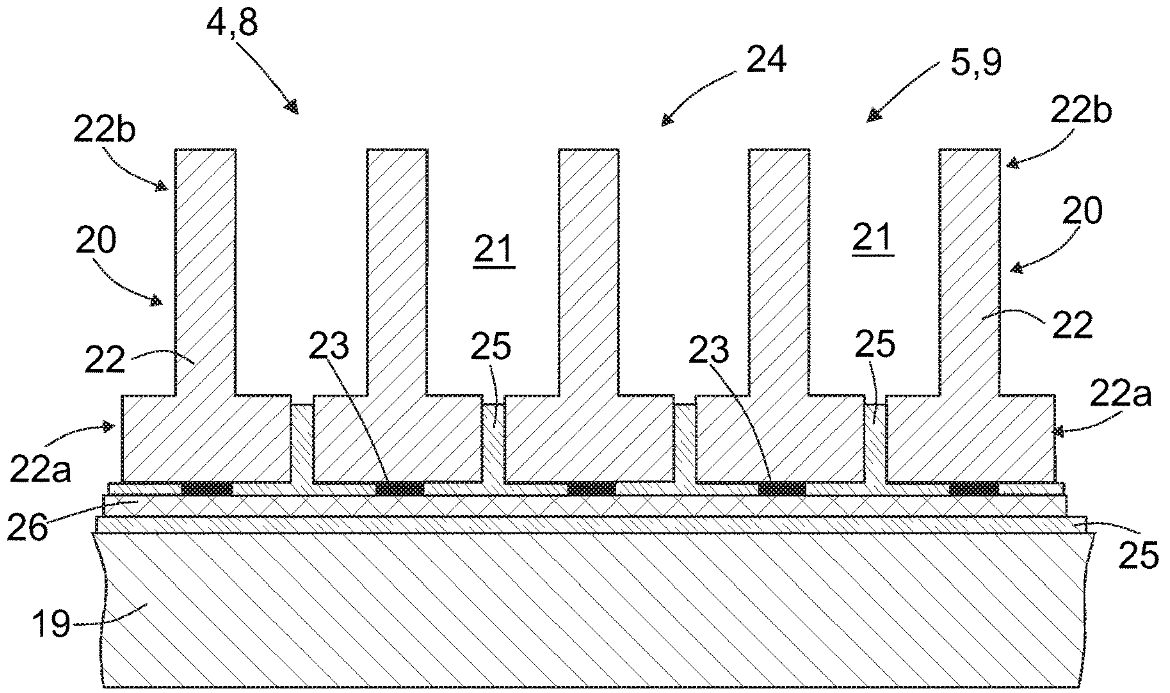
FIG. 4 shows schematically a cross-sectional view of a part of another refining segment.

FIG. 4 shows schematically a cross-sectional view of a part of another refining segment 4, 8. The refining segment 4, 8 of FIG. 4 and the manufacturing method thereof is substantially the same as that disclosed in FIGS. 3A to 3D and the related description above, the difference being a support platform 26 on top of which the profiled wires 22 are pre-fastened for example by spot welds 23. In the embodiment of FIG. 4 the refining bar element 24 is thus formed of the support platform 26 and profiled wires 22 pre-fastened to the support platform 26. The support platform 26 may for example be a perforated plate or a wire mesh. The profiled wires 22 in the refining bar element 24 are fastened to each other and to the support platform 26 with at least one substance 25 and the refining bar element 24 is fastened to the back plate 19 with at least one substance 25.

The disclosed solution is very usable for manufacturing refining segments with very dense refining surface configurations, i.e., the refining surface configurations with a width of the refining bars and a width of the refining grooves in a range of only less one or a few millimeters, these very dense refining surface configurations being in practice impossible or at least unprofitable to manufacture by casting, or very laborious to manufacture by welding refining bars to the back plate one at a time. When the refining bars in the refining segment are implemented of a profiled wire, the profiled wire with a desired cross-section may be manufactured as a single piece of undetermined length, and the profiled wire will only be cut to pieces of suitable length(s) with desired end profiles. The implementation of the refining bars of a profiled wire also solves the problems of incomplete filling of the refining bars and high surface roughness of the refining bars appearing in the refining segments made by casting. The implementation of the refining bars of the profiled wire with a width of the bottom of the profiled wire being different from a width of the top of the profiled wire, such as of the profiled wire with the width of the bottom of the profiled wire being greater than the width of the top of the profiled wire as shown in the figures has the effect that the bottoms of the refining grooves will be also partly implemented of the profiled wires. This has the effect that the bottoms of the refining grooves have substantially smooth surface structures providing substantially constant flow behavior for the flow of the fibrous material in the refining grooves. The effect of the bottoms of the refining grooves being partly implemented of the profiled wires is also that the bottom of the refining groove is implemented only of the bottoms of the adjacent profiled wires and one single seam formed of the said substance, such as of the braze, infiltrated therebetween, whereby no other measures for implementing the refining grooves are not necessary, and at the same time, the number of the seams in the refining segment implementation is minimized, thereby providing a strong structure of the refining surface segment.

The refining bar element 24 comprising the profiled wires pre-fastened to each other and/or to the support platform 26 can be manufactured to exact dimensions for example in a jig before fastening the refining bar element 24 to the back plate 19 of the refining segment 4, 8. The fastening of the refining bar element 24 to the back plate 19 by the at least one solidifying substance 25 removes a need for laborious welding work for fastening the refining bars 20 to the back plate 19 one at a time. The method disclosed thus provides an efficient way, especially in view of manufacturing costs and time, to manufacture refining segments especially with very dense refining surface configurations.

Figure 5:
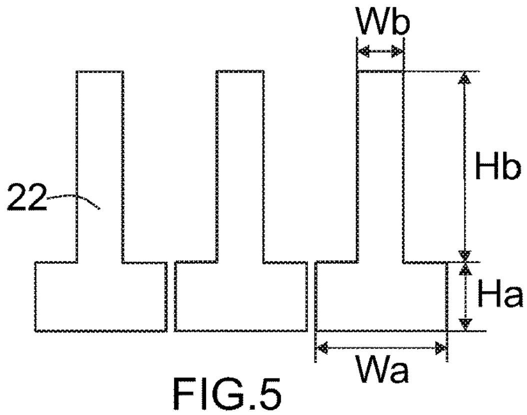
FIGS. 5 to 8 show schematically end views of some profiled wires that may be used to implement refining bars in a refining segment.
Figure 6:
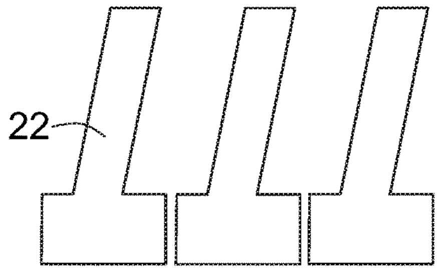
Figure 7:
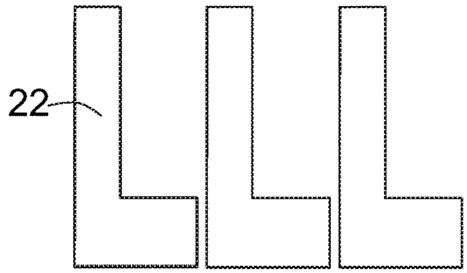
Figure 8:
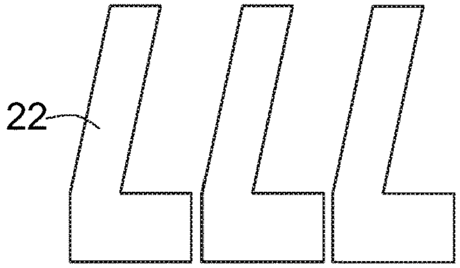

FIGS. 5 to 8 show schematically end views of some profiled wires 22 that may be used to implement refining bars in a refining segment. FIG. 5 shows schematically the profiled wire 22 having a cross-section of inverted T-shape and FIG. 6 shows schematically the profiled wire 22 having a cross-section of inverted tilted T-shape. FIG. 7, in turn, shows schematically the profiled wire 22 having a cross-section of L-shape and FIG. 8 shows schematically the profiled wire 22 having a cross-section of tilted L-shape. Other cross-sectional shapes of the profiled wires are also possible. The selection of the profiled wire 22 with a specific cross-sectional shape may, for example, be based on the fibrous material to be refined, the intended refining effect to be subjected to the fibrous material to be refined and/or the intended flow behavior of the fibrous material on the refining surfaces 5, 9.

Referring to FIG. 5, an example of specific dimensions of a profiled wire 22 which may be utilized for providing refining surfaces with very dense refining surface configurations or characteristics is a profiled wire, wherein the width Wa of the bottom 22*a* of the profiled wire 22 is about 3 mm, the width Wb of the top 22*b* of the profiled wire 22 is about 1.5 mm, the height Ha of the bottom 22*a* of the profiled wire 22 is about 2 mm and the height Hb of the top 22*b* of the profiled wire 22 is about 8 mm. Generally, the width Wb of the top 22*b* of the profiled wire 22 may be about 0.1-10 mm and the width Wa of the bottom 22*a* of the profiled wire 22 may be 1-10 times the width Wb of the top 22*b* of the profiled wire 22. The distance or the gap between the adjacent profiled wires 22 in the refining bar element 24 may for example be 0-10 mm, and preferably about 0.01-0.05 mm The smaller the gap between the profiled wires is, the less amount of the said solidifying substance is needed, what saves costs and provides stronger joint. According to an embodiment, the height of the bottom 22*a* of at least some profiled wires 22 may also be extended to such an extent that the bottoms 22*a* of the profiled wires 22 may form the back plate of the refining segment or at least some part of it.

It will be obvious to a person skilled in the art that, as the technology advances, the inventive concept can be implemented in various ways. The invention and its embodiments are not limited to the examples described above but may vary within the scope of the claims.

I claim:

1. A method for manufacturing a refining segment for refining fibrous material, the method comprising:

arranging at least one set of profiled wires next to each other and fastening adjacent profiled wires to one another to be substantially immovable with respect to each other, wherein a width of a bottom of the profiled wire is different from a width of a top of the profiled wire, to form at least one refining bar element; and placing the at least one refining bar element to overlie a back plate;

fastening the at least one refining bar element onto the back plate, wherein said back plate forms a body of the refining segment, by applying at least one solidifying substance between the at least one refining bar element and the back plate.

2. The method of claim 1 wherein the step of fastening the at least one refining bar element onto the back plate comprises:

applying the at least one solidifying substance onto the back plate; and laying the at least one refining bar element on top of the at least one solidifying substance applied onto the back plate.

3. The method of claim 1 wherein the step of arranging the at least one set of profiled wires next to each other comprises arranging profiled wires in the refining bar element in a substantially parallel straight or curved configuration.

4. The method of claim 1 wherein the step of arranging the at least one set of profiled wires next to each other comprises arranging the profiled wires in the at least one refining bar element substantially immovable with respect to each other by pre-fastening the adjacent profiled wires to each other.

5. A method for manufacturing a refining segment for refining fibrous material, the method comprising:

arranging at least one set of profiled wires next to each other substantially immovable with respect to each other, wherein a width of a bottom of the profiled wire is different from a width of a top of the profiled wire, to form at least one refining bar element; and cutting the at least one refining bar element to a predetermined shape;

fastening the at least one refining bar element onto a back plate after cutting the at least one refining bar element to a predetermined shape, wherein said back plate forms a body of the refining segment, by applying at least one solidifying substance between the at least one refining bar element and the back plate.

6. The method of claim 1 wherein the width of the bottom of each of the profiled wires is greater than the width of the top of the profiled wire.

7. The method of claim 1 wherein the at least one solidifying substance comprises metal.

8. A method for manufacturing a refining segment for refining fibrous material, the method comprising:

arranging a plurality of profiled wires next to each other, each profiled wire being formed of metal and having a base and a refining bar projecting upwardly from the base;

connecting the bases of the profiled wires to one another such that the plurality of profiled wires are held substantially immovable with respect to each other, wherein each base has a width at a bottom of the profiled wire which is greater than a width of a top of the refining bar projecting upwardly therefrom, wherein the connected plurality of profiled wires defines a refining bar element; and placing the refining bar element on a back plate;

fastening the refining bar element onto the back plate, wherein said back plate forms a body of the refining segment, by applying at least one solidifying substance between the at least one refining bar element and the back plate.

9. The method of claim 8 wherein the step of fastening the refining bar element on the back plate comprises disposing a molten metal alloy between the refining bar element and the back plate and allowing the molten metal alloy to cool to thereby fasten the refining bar element to the back plate.

10. The method of claim 9 wherein the back plate is formed of a metal material, and wherein the molten metal alloy comprises a braze of a composition different from the composition of the metal material of the profiled wires and the metal material of the back plate, the braze having a melting temperature which is lower than a melting temperature of the metal material of the profiled wires or a melting temperature of the metal material of the back plate.

11. A refining segment for a refiner for refining fibrous material, the refining segment comprising:

a back plate that forms a body of the refining segment, wherein the back plate is comprised of a metal material and has an upper surface;

refining bars comprised of profiled wires of a metal material and arranged on top of the back plate, wherein each of the profiled wires has a width of a bottom which is different from a width of a top; and wherein a solidifying substance is positioned beneath the refining bars and above the upper surface of the back plate for and extending between the bottoms of the profiled wires, the solidifying substance fastening the refining bars to the back plate, wherein the solidifying substance is of a composition which is different from the metal material of the profiled wires and the back plate.

12. The refining segment of claim 11, wherein the refining bars are arranged on top of the back plate in a substantially parallel straight or curved configuration.

13. The refining segment of claim 11, wherein the width of the bottom of the profiled wires is greater than the width of the top of the profiled wire elements.

14. The refining segment of claim 11 further comprising at least one substance between the refining bars which fastens adjacent profiled wires to each other, the at least one substance between the refining bars substantially remaining between the bottoms of the adjacent refining bars.

15. The refining segment of claim 11 wherein the bottom of each of the profiled wires provides a base section of the refining bar, and the top of each of the profiled wires provides a refining bar of the refining bars.

16. The refining segment of claim 11 wherein the at least one substance comprises metal or an alloy.

17. The refining segment of claim 11 wherein the solidifying substance comprises glue.

18. The refining segment of claim 11 wherein each of the profiled wires has a cross-section of inverted T-shape or of inverted tilted T-shape.

19. The refining segment of claim 11 wherein each of the profiled wires has a cross-section of L-shape or of tilted L-shape.

20. The method of claim 8 further comprising cutting the at least one refining bar element to a predetermined shape before fastening the at least one refining bar element to the back plate.

21. The refining segment of claim 11 wherein each of the profiled wires has a sidewardly extending base section which is wider than an upper refining section of the profiled wire, and wherein the sidewardly extending base sections of the profiled wires are connected together above the base plate.

* * * * *